Sept. 12, 1961 D. M. SCHWARTZ 2,999,553
VEHICLE DRIVE ARRANGEMENT
Filed Feb. 27, 1958 5 Sheets-Sheet 1
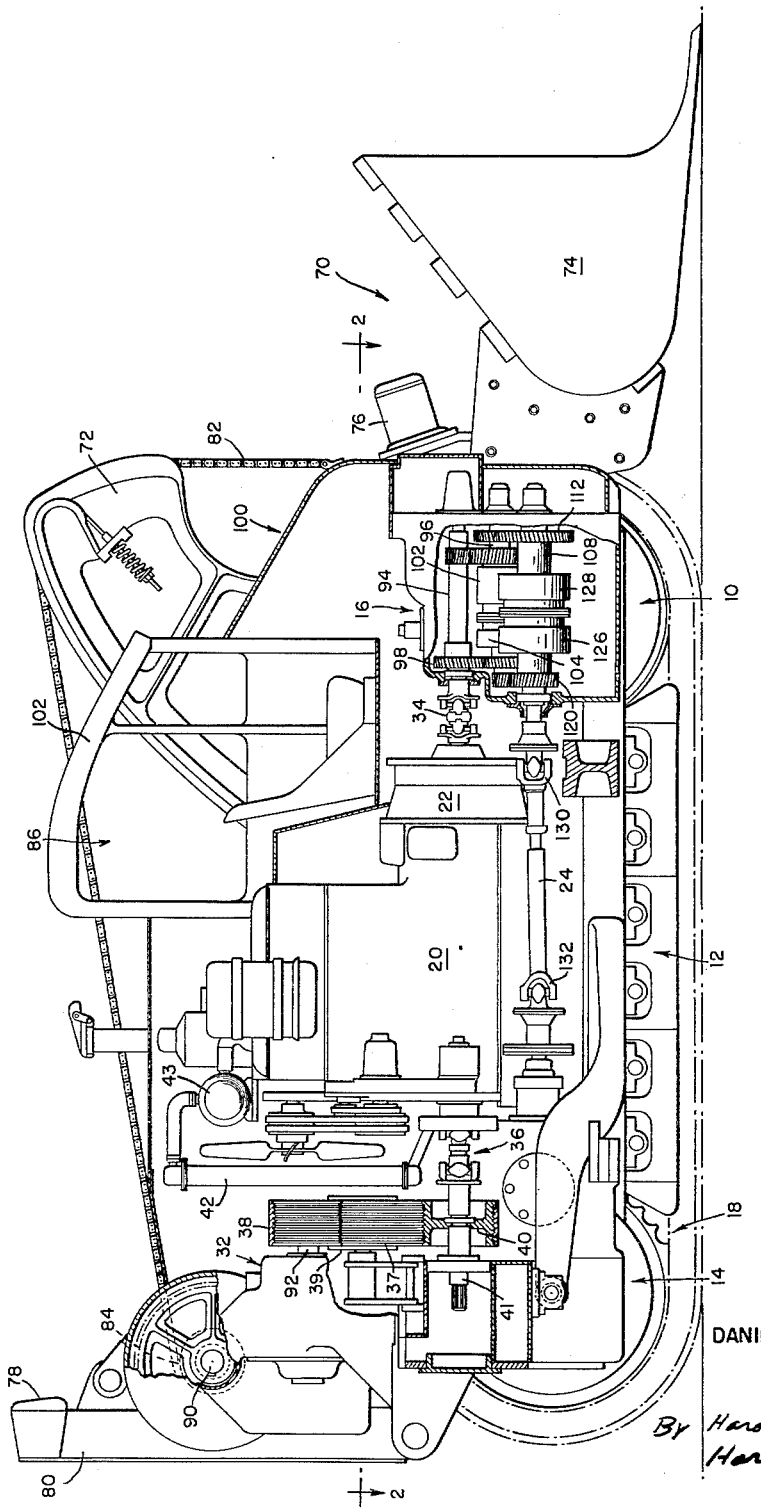
INVENTOR
DANIEL M. SCHWARTZ
By Harold T. Stowell
Harold L. Stowell
ATTORNEYS

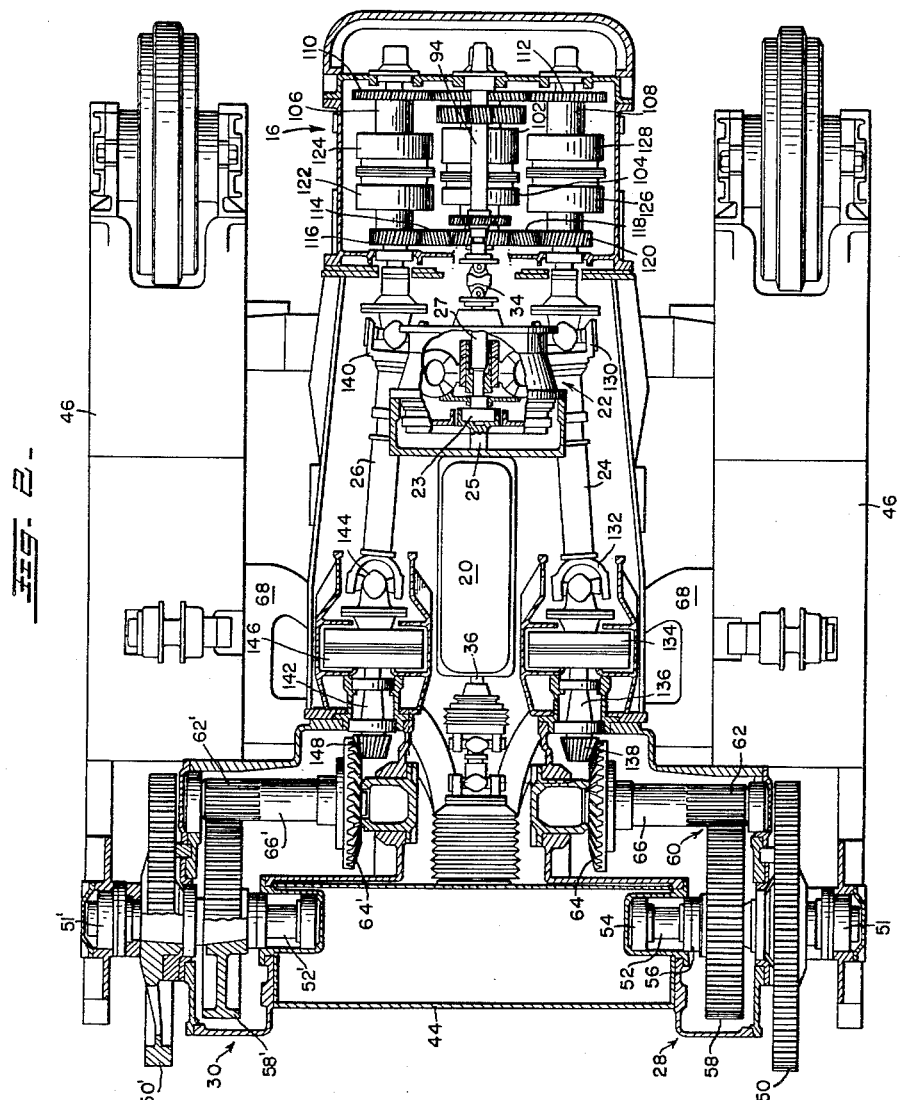

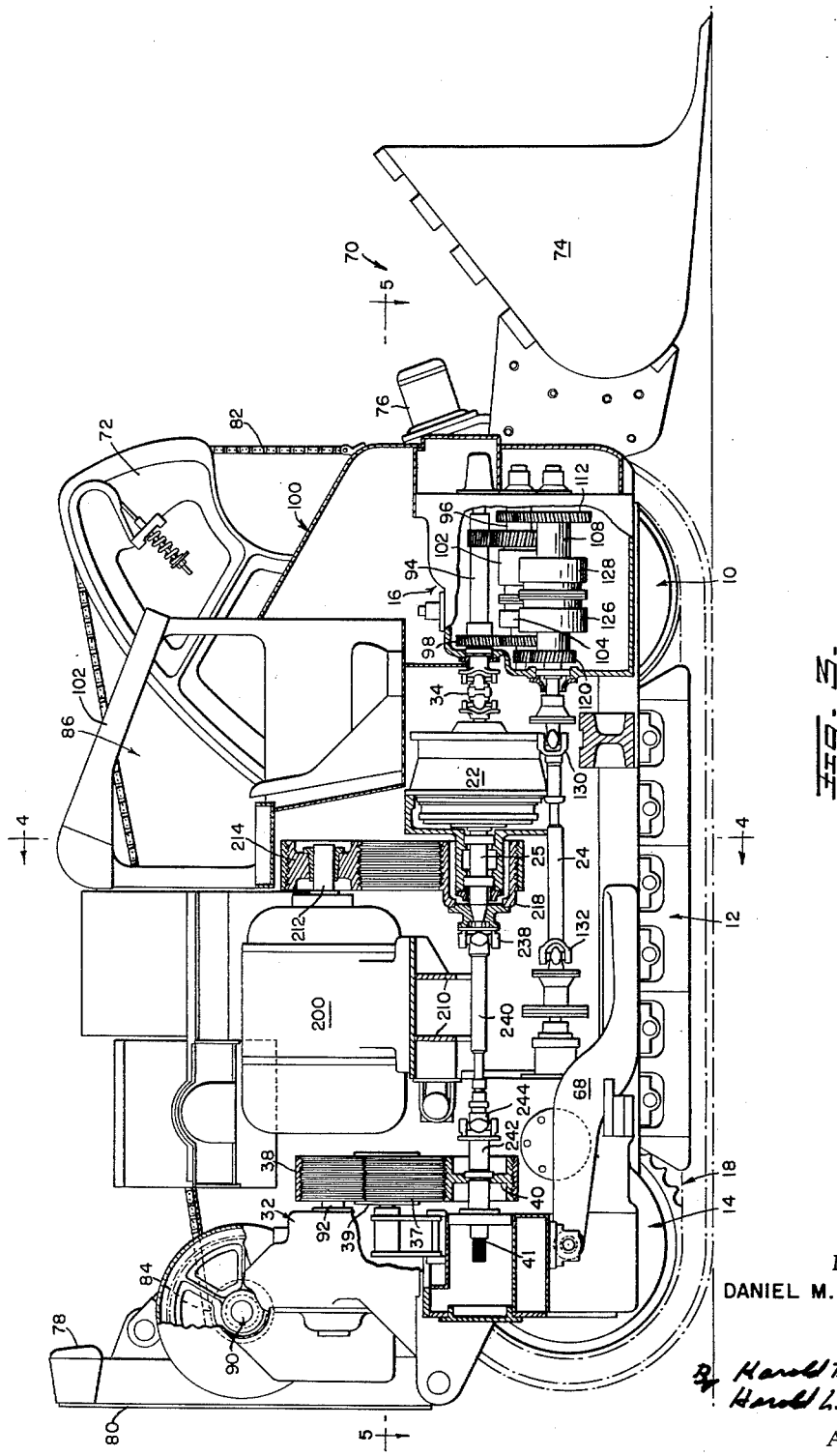

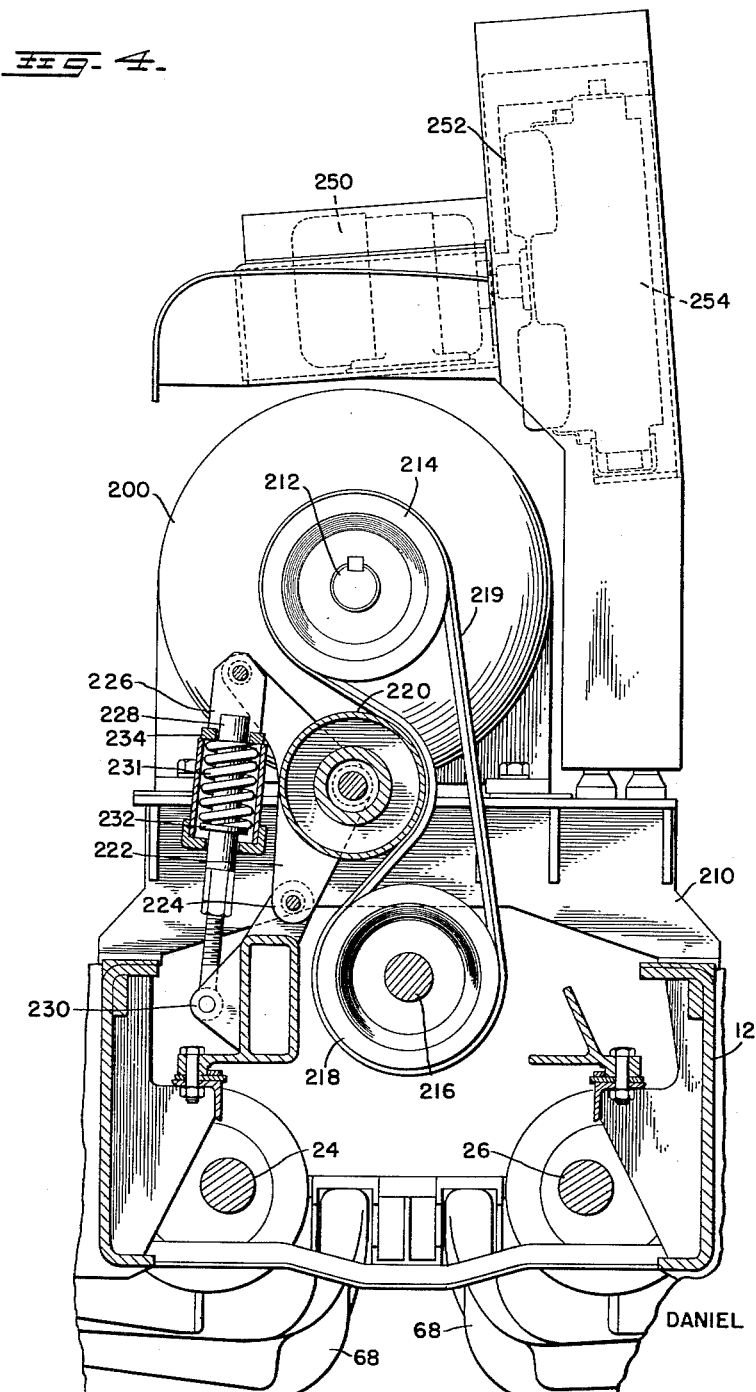

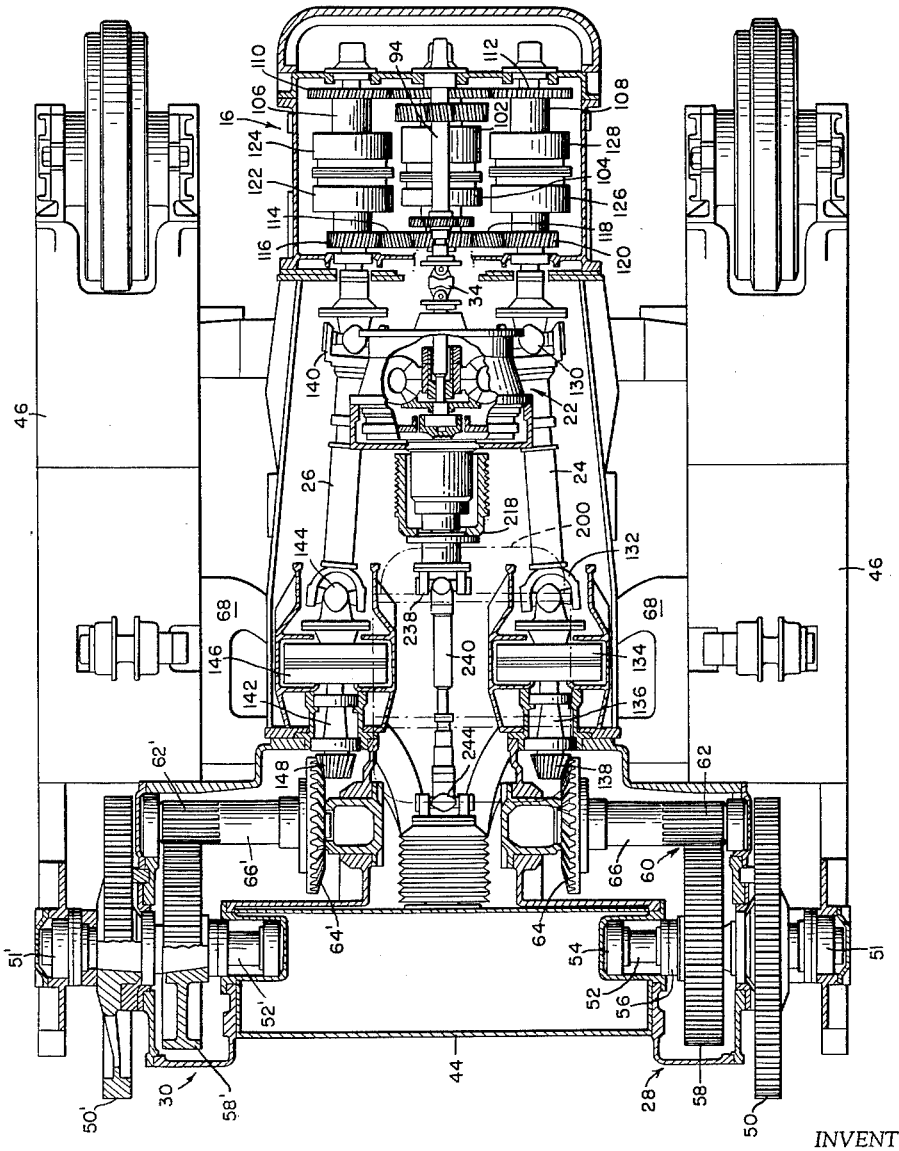

United States Patent Office 2,999,553
Patented Sept. 12, 1961

2,999,553
VEHICLE DRIVE ARRANGEMENT
Daniel M. Schwartz, Salt Lake City, Utah, assignor to
The Eimco Corporation, Salt Lake City, Utah, a corporation of Delaware
Filed Feb. 27, 1958, Ser. No. 717,972
3 Claims. (Cl. 180—6.7)

This invention relates to a vehicle drive arrangement characterized by its versatility and compactness, and the unique interrelationship of the various sections thereof.

The invention will be particularly described with reference to such a machine which includes an overhead discharge type bucket supported thereon and with reference to a vehicle having individual, independently and simultaneously operable crawlers or self-laying track units.

The invention is a continuation-in-part of my application Ser. No. 377,125, filed August 28, 1953, now Patent No. 2,843,213, for Material Handling Machine.

It is an object of the invention to provide a vehicle having a centrally positioned prime mover, which is connected to a forwardly positioned traction unit transmission having dual output shafts extending to final drives at the rearward end of the machine, and a rearwardly extending power output shaft which may be connected to further transmission means for actuating material handling superstructures such as overhead rocker type shoveling mechanism.

A further object is to provide such a machine wherein a single prime mover of the internal combustion or electric type supplies the power for actuating material handling attachments, for motivating the vehicle, and supplying pressure fluid for the operation of the traction unit and material handling transmissions.

Another object is to provide a machine of the class described having improved independently and selectively controllable dual ground-engaging traction units.

A further object is to provide such a machine wherein the frame may be constructed in three sections thereby substantially facilitating assembly, repair and changing of the form of the prime mover from internal combustion to electric or pressure fluid.

These and other objects and advantages of the invention are provided in a mobile material handling machine including a main frame having a front part carrying a traction unit transmission having dual output shafts, the dual output shafts being independently connected to change speed and reverse gears in said traction unit transmission, a center part, a prime mover mounted in said center part and drivably connected to the traction unit transmission in the front part, a rear part, dual final drives for the traction units in the rear part, dual torque shafts extending through the center part and connecting the traction unit transmission output shafts to the final drives, whereby the final drives in said rear part are independently and simultaneously operable for either direction of rotation of the traction units; and by a vehicle having a center part carrying a prime mover, a front part, a traction unit transmission in the front part, means connecting the prime mover and said traction unit transmission, a rear part, dual final drives for the traction units in said rear part, dual torque shafts extending from the traction units transmission in the front part to the dual final drives in the rear part, a rearwardly extending power transmitting shaft and means connecting said rearwardly extending power transmitting shaft to the prime mover in the center part to rotate in unison with the forwardly extending power output shaft from said prime mover.

The invention will be more fully described in conjunction with the illustrated embodiments shown in the accompanying drawings, in which:

FIG. 1 is a side elevational view in partial section of one form of the vehicle of the invention;

FIG. 2 is a section substantially on line 2—2 of FIG. 1;

FIG. 3 is a side elevation in partial section of a modified form of a vehicle;

FIG. 4 is a section substantially on line 4—4 of FIG. 3; and

FIG. 5 is a section substantially on line 5—5 of FIG. 3 with portions broken away for clarity.

With particular reference to FIGS. 1 and 2 of the drawings, there is shown a material handling apparatus embodying the principles of the invention. While the material handling machine shown in the drawings and described hereinafter has an overhead material handling superstructure and endless chain type traction units, it will be evident that other forms of traction units such as wheels could be used and that other types of material handling devices could be carried by the machine without loss of all of the objects and advantages of this invention. The machine includes a main frame consisting of three individual and, preferably, separable sections comprising a forward section 10, a center section 12 and a rear section 14.

The forward section 10 carries a constant mesh hydraulically actuated transmission 16 for the rear drive, endless track type traction units 18.

The center section 12 carries a single prime mover 20, centrally positioned therein, a hydraulic torque converter 22, and a pair of torque shafts designated 24 and 26, only one of which is seen in FIG. 1, which are positioned on either side of the prime mover 20.

The rear section 14 carries the opposed dual drives 28 and 30 for the individually operated crawlers in the lower section and an overhead bucket actuating mechanism including a constant mesh hydraulically actuated bucket transmission, generally designated 32, positioned above the dual drives 28 and 30.

The forward transmission, as described in copending application Serial No. 497,132, filed March 28, 1955, now Patent No. 2,953,941, is connected to the prime mover through a universal coupling 34 to the torque converter 22, while the rear or bucket transmission 32 is connected to the same prime mover by means of a rearwardly extending power take-off 36, belts 37 and belt sheaves 38 and 40. A rear power take-off shaft 41 extends rearwardly from shaft 36 and rotates with sheave 40.

On installations where the prime mover is of the diesel or Otto cycle internal combustion type as in FIG. 1, a coolant heat exchanger 42 for the engine is positioned between the rearward extremity of the engine and the forward extension of the bucket transmission.

A further heat exchanger 43 cools the oil from the torque converter 22 using the water from water radiator 42.

The bucket drive mechanism and transmission is in itself a separate unit which merely bolts to the rear section of the main frame. It will also be seen that the crawler drives 28 and 30 are each separate units which are preferably bolted to a spacer frame 44 to form the lower portion of the rear section 14.

Each of the endless track units 18 comprises a frame 46 notched at its front and rear ends to provide clearance for the front idler wheel 48 and the driven sprocket wheel 50.

Secured to the rearward extensions of the channel members are self-aligning roller bearing units 51 and 51'. The inner bearing races of the units are carried by the live axle shafts 52 and 52' of each drive unit.

Axle 52 is journalled to the right gear drive housing by means of inboard and outboard bearings 54 and 56. Also secured to the axle are sprocket wheel 50 and gear 58. The axle, sprocket and gear are driven, as to be more fully described, through pinion 60 and gears 62 and 64 on the intermediate shaft 66.

The support for axle 52' and the drive means therefor are identical to those for the right hand axle 52 and corresponding elements have been given primed reference numerals.

It will be apparent from the foregoing description of the main and track frames that by constructing the track frames as separate units from the main frame, and by constructing the main frame from a plurality of independent sections, the initial construction costs, assembly, maintenance and repair of the material handling machine are substantially reduced. It will further be evident with this type of construction machines having various track widths may be economically constructed from a minimum of tractor parts. For example, a material handling machine having a wider or narrower track gauge may be constructed from the machine as shown without modification of the track frames 18, or the forward section 10, and the center section 12 of the main frame. The smaller or larger sections required are merely the spacer frame 44, final drives 28 and 30 and diagonal brace members 68.

It is also evident that a change of gauge could be readily made in the field by merely attaching the main frame sections 10 and 12 and the bucket transmission section 32 to a modified rear section 14.

Other substantial advantages of this form of construction will be evident from the following description of the drive mechanisms and the overhead bucket structure, for example, a substantial increase in operator visibility and a substantial increase in the protection of the prime mover and its cooling system is obtained by their central location.

It has further been found that on the present machine the central location of the engine and its cooling system permits use of the machine under extreme conditions such as loading and unloading hot open hearth furnaces, and on very rough ground, without overheating or placing undue strains on the engine or motor. In the conventional material handling tractors with the engine in the forward section, it is cantilevered forward from the main frame and any impacts or shocks in the tractor have the result of causing deflections in the engine and its supports.

As more clearly shown in FIGS. 1 and 3, the main frame of the material handling machine may support an overhead bucket assembly 70 upon parallel tracks or rails secured along each side of the main frame.

The overhead bucket structure is of the overhead rocker type. The side frames 72, only one of which is shown in the drawings, of the rocker structure have curved outer surfaces for rolling engagement with the rails or tracks as is known in the art, the radius of curvature of the surfaces generally increasing from the forward to the rearward ends of the curved sections.

Between the lower ends of the curved rocker arms is supported a shovel bucket 74 and each arm is also provided with a shock absorbing bumper member 76. Each bumper contacts a corresponding plate 78 secured to a rigid frame 80 mounted at the rear end of the main frame.

Flat cable chains 82, one for each rocker arm, are attached at one end to the rocker arms and the other ends are secured to their respective bucket reels 84 of the bucket transmission assembly 32. Rotation of the reels 84 raises the bucket from its forward low digging position as the rocker arms roll rearwardly along tracks to an upward and rearward discharge position.

A control cab 86 as shown in FIGS. 1 and 3 is positioned on the center line of the main frame between the prime mover and the forward transmission 16 with the operator's seat facing forward whereby the operator may conveniently observe the digging and crowding action of the bucket.

When the machine, as shown in the drawings, is employed with an overhead bucket mechanism the top 102 of the cab and the front housing housing section 100 are shaped to clear the path of the bucket as it travels to the rear.

The bucket transmission 32 as described in detail in copending application Serial No. 497,754, filed March 29, 1955, includes a two-speed transmission, the output shaft 90 of which is connected to the pulleys 84 to which one of the ends of cable chain 82, for raising the bucket, is connected. The input shaft 93 of the two-speed bucket transmission 32 shown in FIGS. 1 and 3 is driven from a rearwardly extending output shaft 36 from the internal combustion engine 20 through the arrangement of pulleys 38, 49 and 40. The pulley 40 is secured to an extension of the rearwardly extending output shaft 36 from the prime mover 20. Further, as shown in FIG. 1 of the drawings, the shaft extension, after passing through the pulley 40, extends further rearwardly to provide a rear power takeoff 41 for driving various tractor attachments.

The crawler tracks as previously indicated are driven by the motor through a torque converter 22. The input shaft 23 to the torque converter 22 is connected to the forwardly projecting drive shaft 25 of the internal combustion engine 20. The output shaft 27 from the torque converter is connected through a universal joint 34 to a change speed and reverse transmission of the type described in copending application Ser. No. 497,132, filed March 28, 1955. This transmission includes an input shaft 94 which is gear connected to an intermediate shaft 96 through high and low speed gears 98 and 100. The high and low speed gears are controlled by clutches 102 and 104, respectively. The intermediate shaft is connected to dual output shafts 106 and 108. The connections between the dual output shafts 106 and 108 and the intermediate shaft are through gears 110 and 112 or through pinion 114 and gear 116 or pinion 118 and gear 120 so that the shafts 108 and 106 may be driven at high or low speed or in the forward and reverse direction independently of each other or in unison.

The forward and reverse clutches for shaft 106 are indicated at 122 and 124. The forward and reverse clutches for output shaft 108 are indicated at 126 and 128.

Output shaft 108 of the transmission 16 extends rearwardly and is provided with a universal joint 130 to which torque shaft 24 is connected. The other end of torque shaft 24 is connected through a universal joint 132 to a brake assembly, generally designated 134. The extended rearward end of the shaft 136 carrying the brake assembly 134 is provided with a bevel pinion 138 which meshes with bevel gear 64 of intermediate shaft 66 for the right hand track assembly.

Output shaft 106 of the transmission 16 is connected to rearwardly extending torque shaft 26 through universal joint 140. The other end of the rearwardly extending torque shaft 26 is connected to a further shaft 142 through universal joint 144. Shaft 142 includes a brake assembly 146 and pinion 148 which meshes with bevel gear 64' of live axle assembly 52' carrying at the extended end thereof the drive sprocket 50' for the left hand endless track.

With this arrangement of prime mover, transmission and final drives it will be readily appreciated that using, for example, a diesel prime mover having its greatest efficiency at a relatively constant predetermined r.p.m. the paired left and right crawler tracks for the vehicle may be driven at plural speeds in the forward or reverse directions simultaneously or independently and that the entire transmission, the motor and transmission, the final drives or final drives and motor may be readily removed for repair or replacement without disturbing other elements of the tractor assembly and further that other motion devices as the overhead bucket assembly shown in the drawings may be driven from the same prime mover either simultaneously with the operation of the traction devices or independently thereof.

The novel arrangement of center-mounted motor, forward-mounted reverse and change speed transmission and rear final drive of the invention may be maintained on vehicles having an electric motor drive instead of the internal combustion engine. Electric motor drives are particularly required in underground operations where internal combustion engine exhaust fumes would render the use of diesel power objectionable or impossible.

Referring to FIGS. 3 through 5 the embodiment of the present invention there is shown a vehicle adapted for use with an electric prime mover. The modified form of the invention in general differs only from that shown in FIGS. 1 through 2 in the center section of the machine. The forward section of the machine carrying the change speed and reverse transmission and the rearward end of the machine carrying the final drives and the overhead bucket attachment are substantially identical and, where possible, elements have been provided with reference numerals corresponding to those employed herein in the description of FIGS. 1 and 2.

In view of the difference in shape and size between electric motors and internal combustion engines and the variation in r.p.m. which occur in electric motors when they are operated on different currents and frequencies, which are often encountered in the operation of electric motors from external power supplies, has necessitated placing the output shaft of the motors substantially above the axis of rotation of the input shaft to the torque converter. With this arrangement the optimum speed can be obtained on the torque converter input shaft by proper selection of drive and driven pulleys interposed between the motor output shaft and the torque converter input shaft as will be more readily apparent from the following detailed description of the form of the invention shown in FIGS. 3 through 5.

Referring to FIGS. 3 through 5 on electric motor 200, to be operated by an external source of electric current, is mounted on a structural platform 210 supported from the main frame center section 12 as more clearly shown in FIG. 4 of the drawings. The motor 200 has a forwardly extending power output shaft 212, to which is secured a pulley 214. The pulley 214 is connected to the input shaft 25 of torque converter 22 through a further pulley 218 secured to rotate the torque converter input shaft.

As more clearly shown in FIG. 4 the belt and pulley assembly interconnecting the motor output shaft 212 to the torque converter input shaft 25 includes a further pulley 220. The pulley 220 is rockably mounted to maintain a predetermined tension on belt 219 interconnecting pulleys 214, 218 and 220. The pulley 220 is mounted to the bell crank 222 which bell crank is pivotally mounted at one end to a bracket 224 secured to the main frame center section 12. The extended end of the bell crank 222 is pivotally mounted to the extended end of a piston 226. The piston 226 is mounted for reciprocation on shaft 228 which shaft is pivotally mounted adjacent its lower end to a boss 230 carried by bracket 224.

A helical spring 231 bears at one end against a ring 232 secured to the shaft 228 and at the other end against the top of the piston 234. Thus, the pulley 220 is constantly urged into engagement with the belt 219 by the force of a spring 231 whereby a substantially uniform tension is maintained on the belt arrangement.

Energization of the electric motor 200 drives the input shaft 25 of the torque converter through the belt 219 and the pulleys 214 and 218. The output shaft 34 from the torque converter 22 drives the input shaft 102 of the change speed transmission 16 as more fully described with reference ot FIGS. 1 and 2. The change speed and reverse transmission 16 drives the paired crawler tracks through the dual final drives 28 and 30. The final drives 28 and 30 are connected respectively to the dual output shafts 108 and 106, and the rearwardly extending torque shafts 24 and 26 as hereinbefore described whereby each of the crawler tracks may be driven at various speeds in the forward or reverse directions simultaneously or independently to provide the novel vehicle of the present invention.

Extending rearwardly from the rearward end of the pulley 218 is a universal joint 238 from which extends rearwardly the shaft 240. Shaft 240 in turn is coupled to shaft 242 through universal joint 244. The shaft 242 carries pulley 40 of the belt and pulley drive for the two speed overhead rocker bucket transmission 32. The arrangement hereinbefore described wherein the driven pulley 218 is of the sheath type construction and envelops the support housing for the input shaft 25 of torque converter 22 and the provision of the rearwardly extending drive shaft 240 for the rear transmission maintains at a minimum the longitudinal space required for the large electric prime mover 200 and its plural pulley drive arrangement without increasing the overall length of the machine from that shown in FIGS. 1 and 2 wherein the prime mover comprises an internal combustion engine.

Referring to FIG. 4 of the drawings the modified system of the invention includes a second electric motor 250 which drives a fan 252 for heat exchanger 254. The heat exchanger 254 is connected by conduits (not shown) to the hydraulic fluid in the torque converter 22. Thus, the electric motor driven air cooled heat exchanger 254 of the electric motor form of the invention replaces the water oil intercooler 44 of the internal combustion prime mover form of the invention shown in FIGS. 1 and 2.

From the foregoing description, it will be seen that the present invention comprising a new and improved material handling machine and while preferred embodiments of the present invention have been described in detail with reference to the drawings, it will be evident to those skilled in the art that various modifications may be made in the arrangement of the cooperating components.

I claim:

1. A mobile material handling machine having a main frame, a traction unit transmission at the forward end of the main frame, said transmission unit including at least an input shaft and dual output shafts, each of said shafts extending rearwardly from said traction unit transmission, said dual output shafts being independently connected to change speed and reverse gears in the traction unit transmission, a prime mover mounted on said main frame rearwardly of the traction unit transmission, means drivably connecting the prime mover to the input shaft of the traction unit transmission, dual final drives at the rearward end of the main frame, paired traction units for the material handling machine, means connecting each of the traction units to its respective final drive, dual torque shafts independently connecting the dual output shafts from the traction unit transmission to the dual final drives whereby the traction units are independently and simultaneously operable in either direction of rotation.

2. The invention defined in claim 1 including a further torque shaft, means connecting said further torque shaft to the prime mover, a second transmission at the rearward end of the main frame, and means connecting said further torque shaft to said second transmission.

3. The invention defined in claim 2 wherein said further torque shaft is coaxial with the input shaft to said traction unit transmission and rotatable therewith.

References Cited in the file of this patent

UNITED STATES PATENTS

| | | |
|---|---|---|
| 1,270,826 | Houghton | July 2, 1918 |
| 1,278,256 | Thompson | Sept. 10, 1918 |
| 1,423,642 | Beal | July 25, 1922 |
| 2,054,608 | Storey | Sept. 15, 1936 |
| 2,362,129 | Gfrorer | Nov. 7, 1944 |
| 2,717,523 | Lammerz | Sept. 13, 1955 |
| 2,787,171 | Silver | Apr. 2, 1957 |
| 2,843,213 | Schwartz | July 15, 1958 |
| 2,874,591 | Thoma | Feb. 24, 1959 |